(12) United States Patent
Okuda et al.

(10) Patent No.: US 7,873,205 B2
(45) Date of Patent: Jan. 18, 2011

(54) APPARATUS AND METHOD FOR CLASSIFYING DEFECTS USING MULTIPLE CLASSIFICATION MODULES

(75) Inventors: Hirohito Okuda, Yokohama (JP); Yuji Takagi, Kamakura (JP); Toshifumi Honda, Yokohama (JP); Atsushi Miyamoto, Yokohama (JP); Takehiro Hirai, Ushiku (JP)

(73) Assignee: Hitachi High-Technologies Corporation, Tokyo (JP)

( * ) Notice: Subject to any disclaimer, the term of this patent is extended or adjusted under 35 U.S.C. 154(b) by 874 days.

(21) Appl. No.: 10/809,464

(22) Filed: Mar. 26, 2004

(65) Prior Publication Data

US 2004/0252878 A1 Dec. 16, 2004

(30) Foreign Application Priority Data

Mar. 28, 2003 (JP) ............................. 2003-089686

(51) Int. Cl.
*G06K 9/00* (2006.01)
(52) U.S. Cl. ...................... 382/145; 382/141; 382/149
(58) Field of Classification Search ................. 382/145, 382/152, 181, 231
See application file for complete search history.

(56) References Cited

U.S. PATENT DOCUMENTS

| | | | |
|---|---|---|---|
| 5,699,447 A | | 12/1997 | Alumot et al. |
| 5,852,470 A | * | 12/1998 | Kondo et al. ................. 348/448 |
| 6,801,650 B1 | * | 10/2004 | Kikuchi et al. .............. 382/145 |
| 6,922,482 B1 | | 7/2005 | Ben-Porath |
| 7,035,447 B2 | * | 4/2006 | Take .......................... 382/145 |

FOREIGN PATENT DOCUMENTS

| | | |
|---|---|---|
| JP | 2001-135692 | 5/2001 |
| JP | A-2001-135692 | 5/2001 |

OTHER PUBLICATIONS

Kuk Wo Ko, Such Cho, "Soder Joints Inspection Using A Neural Network and Fuzzy Rule-based Classification Method", Apr. 2000, IEEE, vol. 23, No. 2, pp. 93-103.*

Lei Xu, Adam Krzyzak, "Methods of Combining Multiple Classifiers and Their Applications to Handwriting Recognition", May/Jun. 1992, IEEE, vol. 22, No. 3, pp. 418-435.*

Henry, et al, "Application of ADC Techniques to Caracterize Yield-Limiting Defects Identified With the Overlay of E-Test/Inspecting Data On Short Loop Process Tester", Sep. 1999, IEEE/SEMI, pp. 330-337.*

(Continued)

*Primary Examiner*—Brian Q Le
*Assistant Examiner*—Edward Park
(74) *Attorney, Agent, or Firm*—Antonelli, Terry, Stout & Kraus, LLP.

(57) ABSTRACT

A classification model optimum for realization of a defect classification request by a user is not known by the user. Then, the user sets a classification model which is not necessarily suitable and makes classification, resulting in degradation in classification performance. Therefore, the present invention automatically generates plural potential classification models and combines class likelihoods calculated from the plural classification models to classify. To combine, an index about the adequacy of each model, in other words, an index indicating a reliable level of likelihood calculated from the each potential classification model, is also calculated. Considering the calculated result, the class likelihoods calculated from the plural classification models are combined to execute classification.

10 Claims, 12 Drawing Sheets

OTHER PUBLICATIONS

Kuk Wo Ko, Such Cho, "Solder Joints Inspection Using A Neural Network and Fuzzy Rule-Based Classification Method", IEEE Transactions On Electonics Packaging Manufacturing, vol. 23, No. 2, Apr. 2000 pp. 93-103.

Xu, L, "Methods of Combining Multiple Classifiers And Their Applications To Handwriting Recognition" IEEE Transactions on Systems, Man and Cybernetics, vol. 22 No. 3 May 1992, pp. 418-435.

Henry, et al "Application of ADC Techniques to Characterize Yield-Limiting Defects Identified With the Overlay of E-Test/Inspecting Data On Short Loop Process Testers" Advanced Semiconductor Manufacturing Conference, 1999 IEEE/SEMI Boston, MA Sep. 8-10, 1999 pp. 330-337.

* cited by examiner

MAIN CLASS SCREEN

USER CLASS SCREEN

RECIPE SETTING SCREEN

← SEEMS TO BE FOREIGN MATERIAL  
→ SEEMS TO BE PATTERN OR RECESS

MAHALANOBIS DISTANCE FROM FOREIGN MATERIAL CLASS OF DATA X
$= (x - \mu)/\sigma$

APPARATUS AND METHOD FOR CLASSIFYING DEFECTS USING MULTIPLE CLASSIFICATION MODULES

BACKGROUND OF THE INVENTION

The present invention relates to a method for automatic classification of data. Particularly, the present invention relates to a method for automatic classification of defects occurred on the surface of a semiconductor electronic circuit board, a printed circuit board, a liquid crystal display board or the like according to a detected image, an EDX detection spectrum, or the like.

Recently, methods for automatic classification by detecting an image of a defect portion have been developed in order to quickly grasp the situation of the defect occurred on the surface of a semiconductor electronic circuit board or the like and to monitor the number of occurrences per each type of defect.

For the automatic classification of images, various methods are conventionally studied in a field of pattern recognition.

One of conventional methodologies is a method called the learning type classification. According to this methodology, a teacher image is collected in advance and learned to optimize a classification apparatus (neural network, etc.). A learning type classification apparatus has a possibility that it can classify with flexibility in accordance with the request made by a user but has a disadvantage that it cannot be used substantially at the startup of a production process because it is generally necessary to collect a large volume of teach data so as to obtain good performance. It is known that, when a small volume of teach data alone is used, a phenomenon of excessive conformity of learning with the teach data, which is called overlearning, occurs, resulting in degradation in performance.

There is also another conventional methodology called a rule-based classification method. According to this methodology, a characteristic amount is extracted from an image to be classified, and the value of the characteristic amount is judged according to the "if-then" rule incorporated into the system to classify a defect into one of classes. A rule-based classification apparatus cannot respond flexibly to the request by the user because a class rule for classification is fixed but has an advantage that it can be used from the startup of the production process because teach data is not required.

The above-described rule-based classification apparatus and the learning type classification apparatus may be used together as one method. An example of such a method is disclosed in Japanese Patent Laid-Open Publication No. 2001-135692. Specifically, a defect is classified into a previously incorporated fixed number of classes (called the "core classification") by the rule-based classification apparatus called the "core classifier" and further classified into an arbitrary number of "low-order classification" by the learning type classification apparatus called the "particular applicable classifier" which is associated with the core classification.

The example disclosed in the above-described patent publication uses the core classifier and can conduct the core classification from the startup of the process without necessity of collecting an amount of teach data. If classification in further detail is required, the classification can be made by the learning type "particular applicable classifier".

The above-described prior art needs to decide previously a classification model combining the rule-based classification apparatus and the learning type classification apparatus. But, it is generally very hard to determine an optimum classification model in advance, possibly resulting in degradation in performance because the classification model is inadequate. Description will be made by examples below.

FIG. 2 to FIG. 4 show three types of classification models for classification of defects into four classes of an on-the-film foreign material, a below-the-film foreign material, a recess and a pattern defect. It will be described below that an optimum classification model is variable depending on a distributed state of defects.

FIG. 2 shows an example of a single layer classification model. A rule-based classification apparatus 21 corresponds to Section 1 and classifies into four classes of an on-the-film foreign material 22, a below-the-film foreign material 23, a recess 24 and a pattern 25.

The rule-based classification apparatus is superior to the learning type classification apparatus on the point that it can deliver stable performance as long as a designed rule adequately matches the target to be classified.

In a field of classification of defects, the causes of defects have become diverse with a technological evolution of the production process, and the classes for classification of defects have also varied accordingly. Therefore, it is hard to classify the defects of products, which are produced through different production processes, by using universal defect classification classes, and it must be said that a possibility of applicability of the rule previously assumed for a prescribed production process by a designer to the products produced by a different production process is very low. In this connection, the classification classes such as handwritten numeric recognition classification, etc. are considerably different from the setting determined at the time of designing.

FIG. 3 shows a double-layered classification model. A first layer's rule-based classification apparatus 31 classifies into three classes of a foreign material 32, a recess 33 and a pattern 34, and a second layer's learning type classification apparatus 35 further classifies the foreign material 32 into two classes of an on-the-film foreign material 36 and a below-the-film foreign material 37.

According to the example of the single layer classification model shown in FIG. 2, a detected defect is classified into one of the four classes desired by the user, while according to the model shown in FIG. 3, a probability of applicability of the designed rule can be made high on the point that the classification into three classes or any of them is conducted. Meanwhile, when the classification into the on-the-film foreign material or the below-the-film foreign material is conducted by the second layer's learning type classification apparatus, a possibility capable of classifying with reliability higher than the rule-based classification assumed by the designer becomes high in a condition that teach data on the on-the-film foreign material and the below-the-film foreign material is adequately large.

FIG. 4 shows a double-layered classification model of a type different from that shown in FIG. 3. The first layer classifies into three classes of a foreign material, a recess and a pattern, and the second layer further classifies the foreign material into two classes of an on-the-film foreign material and a below-the-film foreign material. A classification apparatus corresponds to Section 1 and Section 2 of the classification model. Here, it is assumed that Section 1 is a rule-based classification apparatus and Section 2 is a learning type classification apparatus.

In the example shown in FIG. 4, Section 2 is different from that of the classification apparatus shown in FIG. 3 and seems something different. The learning type classification apparatus of Section 2 is a learning type classification apparatus, which classifies the defect classified as a foreign material by the classification apparatus of the first layer into an on-the-film foreign material, a below-the-film foreign material or a pattern defect. The recess and the pattern defect can be separated with high reliability by the rule-based classification apparatus, but there is a possibility that the foreign material only is separated with high classification performance as compared with the model shown in FIG. 3 in a situation that it cannot be separated from the pattern defect.

Besides, a big difference of the classification model shown in FIG. 4 from the classification trees shown in FIGS. 2 and 3 is that it is a classification model different from a hierarchical relationship (semantic classification model) in terms of a classification concept the user has. The foreign material and the pattern defect are of exclusive classes from each other in terms of the user's classification concept, and the pattern defect cannot be located below the foreign material. But, the classification model achieving the maximum classification performance and the user's conceptual classification model can be independent mutually except when the bottom layer is a class finally classified by the user. It also suggests that it is hard for the user to determine an optimum classification model.

It can be said from the above that the optimum classification model for an automatic defect classification problem is variable depending on the problem setting. And, this problem setting (a level of adequacy of the rule by a designer, a possibility of collecting learn data, etc.) cannot be assumed in advance, so that an optimum classification model cannot be determined in advance either. As a result, there occurs a problem that the classification performance drops because the classification model is not optimum.

To achieve the maximum performance, the classification tree automatically provides an inherent and optimum classification model in response to a user's defect classification request, which is variable depending on the users, thereby improving the classification performance. Besides, it eliminates the necessity of manual setting of the classification model. It is hard for the user to previously determine the optimum classification model because it does not always match the conceptual classification model (generally called the semantic gap).

SUMMARY OF THE INVENTION

The present invention remedies the above described disadvantages of the prior art and relates to a method and its apparatus for classifying defects, which are capable of improving classification performance by automatically providing an inherent and optimum classification model in response to a defect classification request which is variable depending on users or making it possible for the user to easily select it.

Specifically, the invention first generates one or plural potential classification models. For example, the potential classification model is comprised of a hierarchical structure of the rule-based classification apparatus and the learning type classification apparatus as shown in FIG. 2, FIG. 3 or FIG. 4. It is assumed that the potential classification model is set by the user through the screen, set by using teach data or set automatically as described in detail later. When plural classification models are generated, an index (hereinafter referred to as the model likelihood) about the adequacy of each model is calculated. In other words, the model likelihood is an index indicating a degree of reliability that the likelihood calculated by each potential classification model can be trusted.

Then, the class likelihood of each potential classification model is calculated. According to the model likelihood, the class likelihoods calculated by the plural classification models are combined to make classification. For the combination of the class likelihoods, the likelihoods are combined with importance relatively attached to a high model likelihood or a class likelihood calculated by a reliable model and without importance relatively attached to a low model likelihood or a class likelihood calculated by an unreliable model.

Thus, an inherent and optimum classification model can be set easily or can be provided automatically in response to a defect classification request variable depending on users, and it becomes possible to improve classification performance.

These and other objects, features and advantages of the invention will be apparent from the following more particular description of preferred embodiments of the invention, as illustrated in the accompanying drawings.

BRIEF DESCRIPTION OF THE DRAWINGS

FIG. 9A shows a rule-based classification screen, FIG. 9B shows a learning type classification screen, and FIG. 9C shows a recipe setting screen;

DESCRIPTION OF THE EMBODIMENTS

The first embodiment of the invention will be described with reference to the accompanying drawings.

First, the present invention detects a defect of a sample by a defect inspection apparatus using an optical microscope or an electron microscope. Here, the sample to be inspected includes a semiconductor electronic circuit board, a printed circuit board, an FPD, a liquid crystal display board and the like. For classification of defects, a defect portion caused on the surface of such a board is detected by the defect inspection apparatus using the optical microscope or the electron microscope, position coordinate information on the defect detected on the board is stored, the sample is positioned based on the stored position coordinate information on the defect so that the defect on the sample falls in the detection field of view of a review apparatus, an image of the defect is obtained by the review apparatus, and the obtained image of the defect is processed.

Figure 8:
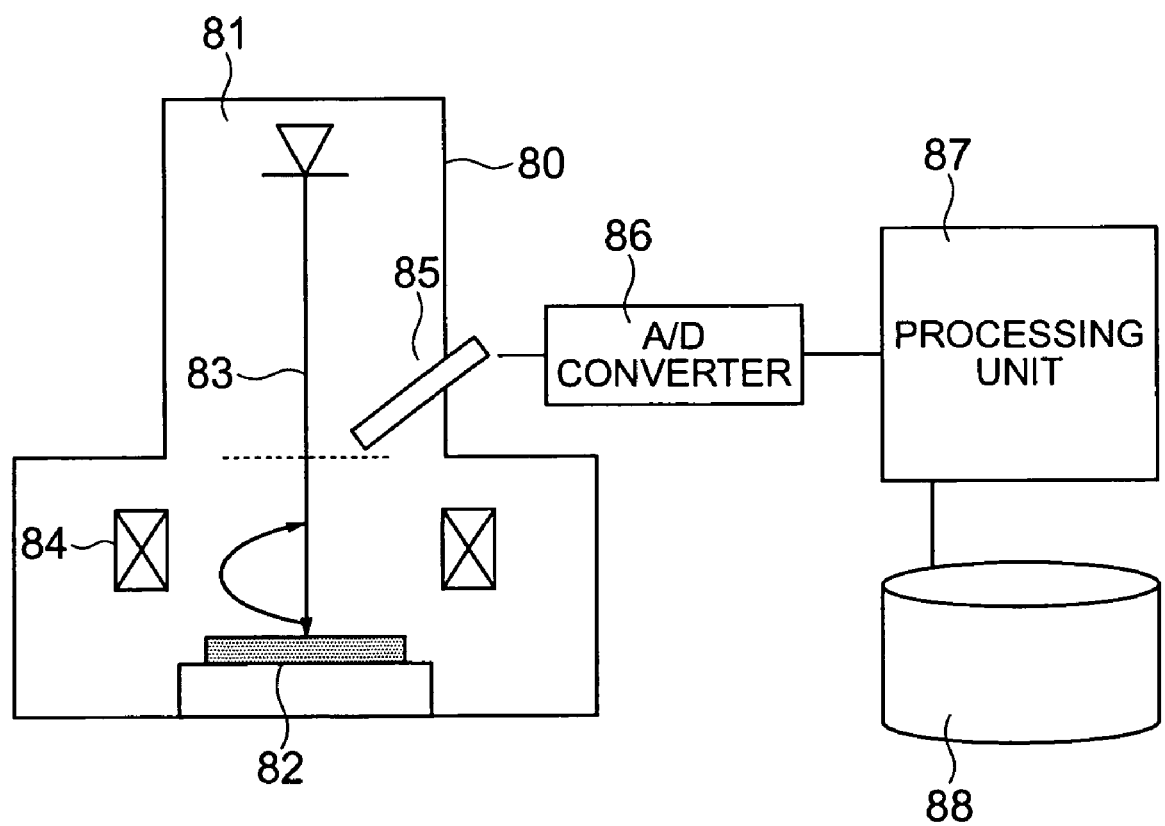
FIG. 8 is a block diagram showing a schematic structure of a defect review apparatus according to the first embodiment of the invention.

FIG. 8 shows a schematic structure of the defect review apparatus according to the invention. In FIG. 8, 80 denotes an electron microscope which deflects an electron beam 83 by a deflector 84 according to the position coordinate information on the defect detected by the defect inspection apparatus to scan and irradiate a semiconductor substrate 82, which is subject to the inspection and positioned within a housing 81, with the electron beam 83, and detects by a detector 85 a secondary electron produced from the semiconductor substrate 82 in synchronization with the deflected signal from the deflector 84. The detected secondary electron is converted into an electric signal, which is then converted into a digital image signal by an A/D converter 86, and it is input as a defect image signal to a processing unit 87. The processing unit 87 analyzes the input digital defect image signal by the software processing to classify automatically. The processed result and the detected image are stored in a storage device 88.

Then, a method of classifying the defect by processing the defect image obtained by the review apparatus will be described.

(1) Outline of defect classification

Figure 1A:
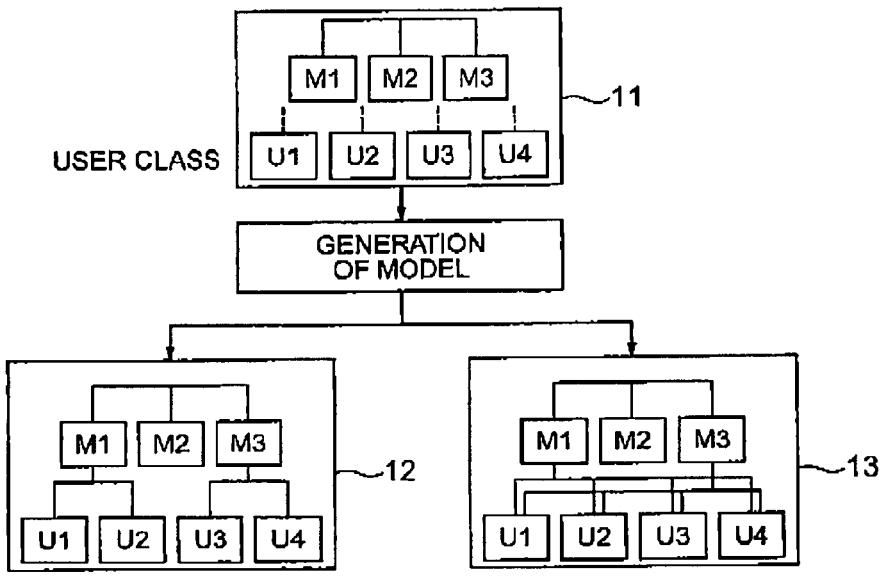
FIG. 1A and FIG. 1B are diagrams each showing a flow of generation of a classification model according to a first embodiment.
Figure 1B:
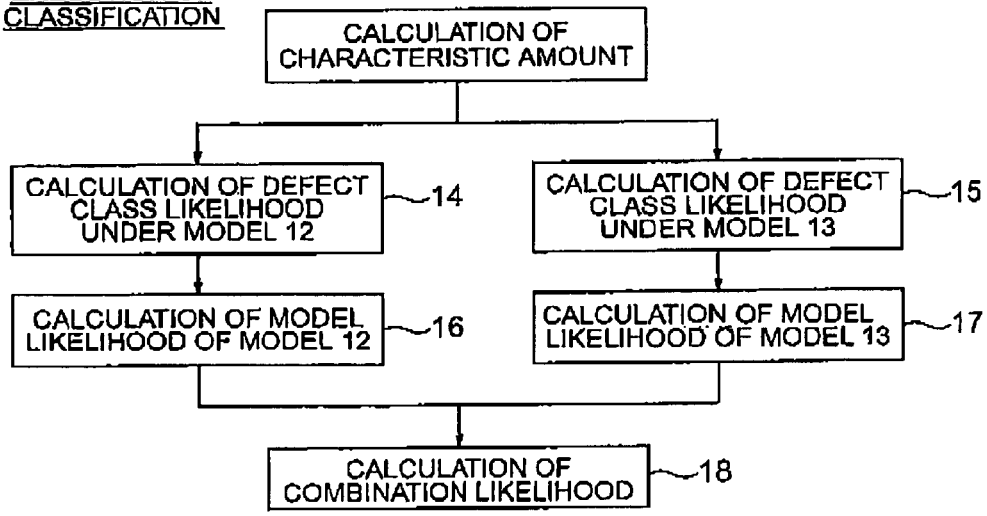
Figure 2:
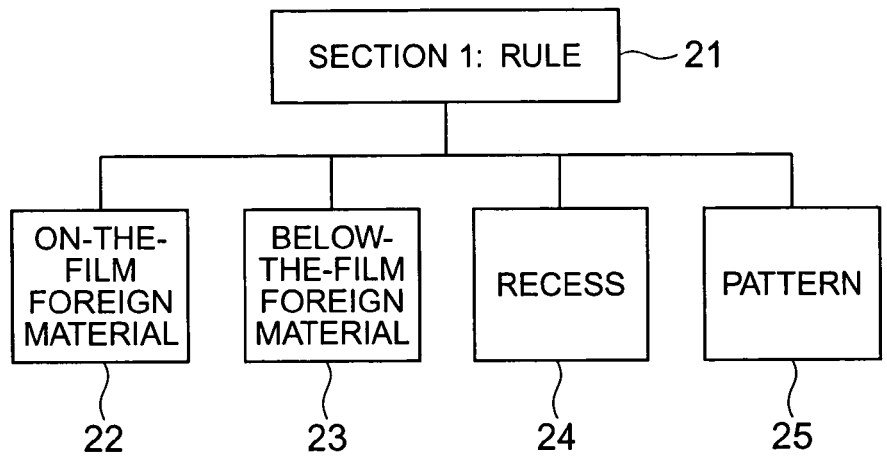
FIG. 2 is a diagram showing an example of the classification model.

First, the defect classification according to the invention is described briefly with reference to FIG. 1A and FIG. 1B. The defect classification comprises two steps of (i) previous generation of a classification model before the execution of classification processing and (ii) execution of classification.

(i) Generation of Classification Model

Numeral 11 denotes a state before the generation of a classification model. M1, M2 and M3 in the drawing denote classes (hereinafter referred to as the main classes) which are previously provided by the system of the present invention, and U1 through U4 denote classes (hereinafter referred to as the user classes) determined by the user. The user determines the user classes manually or by using teach data on the setting screen. Here, it is not determined previously which user class is located below which main class. Meanwhile, for example, at least one model having a combination of main classes and user classes each indicated by 12 and 13 is generated. The model generation may be set manually on the setting screen or made automatically by the method to be described layer. In the automatic generation, the correlation between the main class likelihood-calculated result by the rule-based classification apparatus and the user class taught by the user is analyzed.

Here, it will be described with reference to FIG. 10A and FIG. 10B that an appropriate model is variable depending on defect data and, therefore, there is a possibility of improving the classification performance by assuming not a single classification model but plural classification models.

Figure 3:
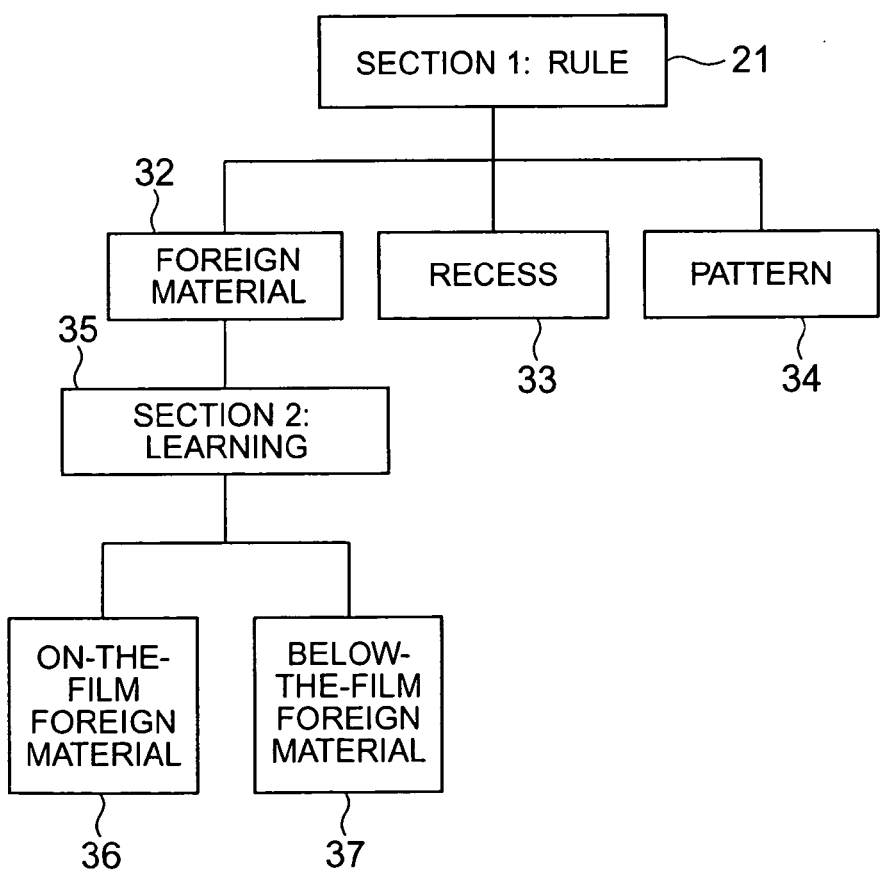
FIG. 3 is a diagram showing another example of the classification model.
Figure 10A:
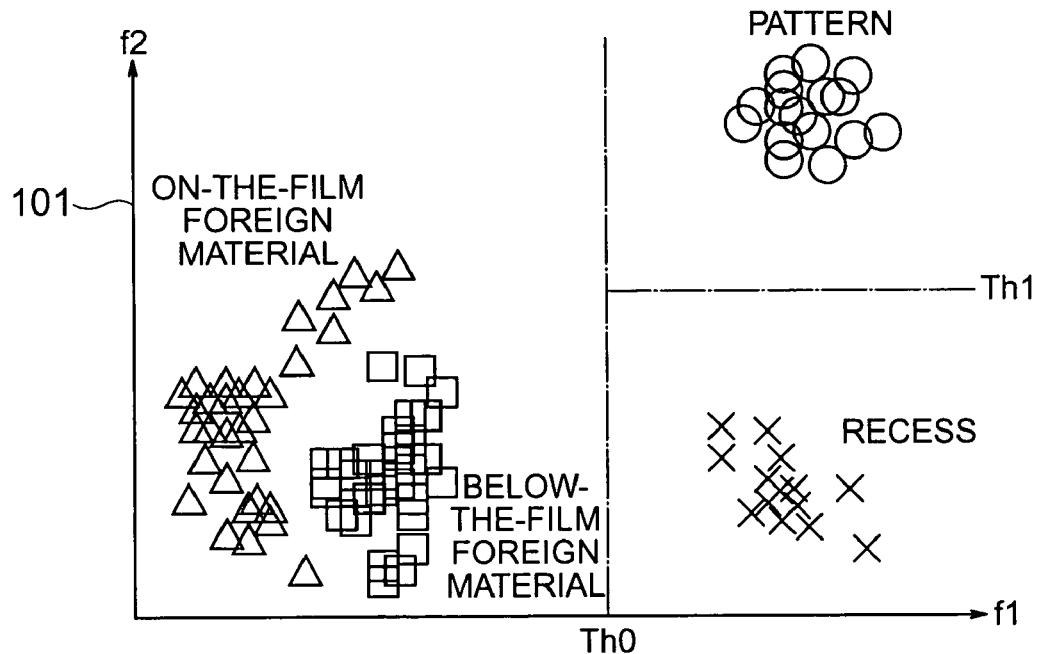
FIG. 10A and FIG. 10B are graphs each showing a distribution of a characteristic amount of defects.
Figure 10B:
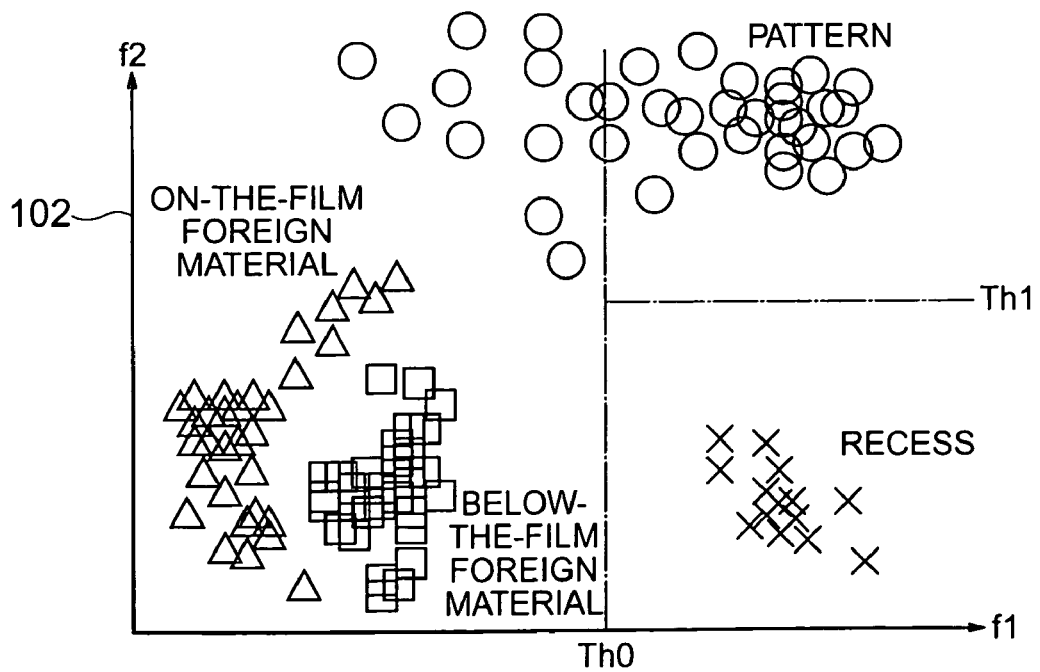

A graph 101 in FIG. 10A and a graph 102 in FIG. 10B each show an example of the distribution of a characteristic amount. In the graph 101 in FIG. 10A, the "foreign material", the "recess" and the "pattern" are distributed to adequately separate from one another, so that it is expected that the classification model combining the rule-based classification apparatus 31 and the learning type classification apparatus 35 as shown in FIG. 3 is suitable. When it is assumed that likelihood functions $L_{foreign\ material}(f1, f2)$, $L_{pattern}(f1, f2)$ and $L_{recess}(f1, f2)$ according to the rule-based classification apparatus are defined as follows, the rule-base type likelihood becomes a very effective criterion for classification.

When $L_{foreign\ material}(f1, f2)$: $f1<Th0$, the likelihood of the foreign material is large;

when $L_{pattern}(f1, f2)$: $f1>Th0$ and $f2>Th1$, the likelihood of the pattern is large; and when $L_{recess}(f1\ f2)$: $f1>Th0$ and $f2<Th1$, the likelihood of the recess is large.

Figure 4:
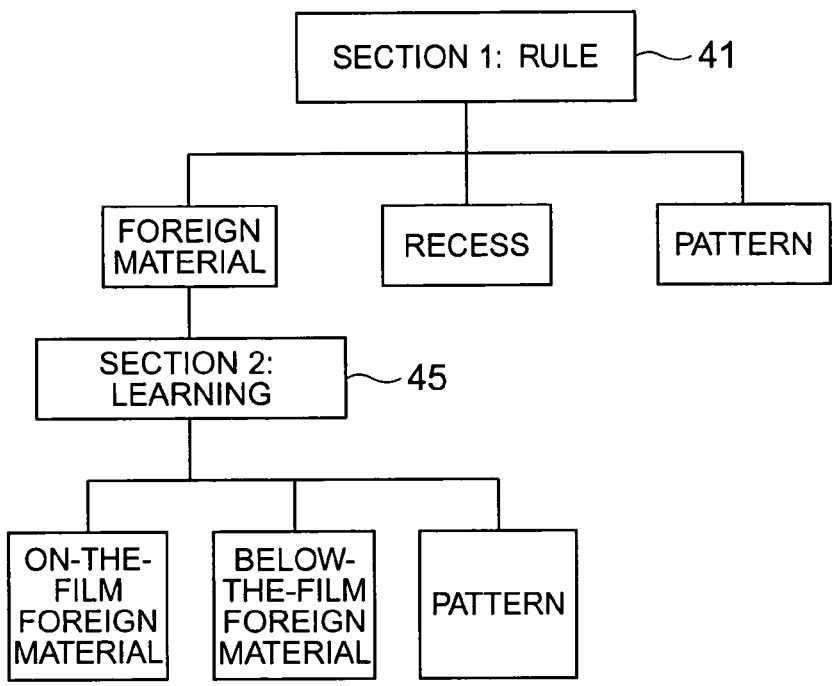
FIG. 4 is a diagram showing another example of the classification model.

Meanwhile, in the distributions shown in the graph 102 of FIG. 10B, the rule-based classification apparatus 31 configured as shown in FIG. 3 comes to have a high possibility of classifying not only the "foreign material" 32 but also the "pattern" 34 into a large number of "foreign material" 32. Therefore, when the "foreign material" 32 is further subdivided by the learning type classification apparatus 35, the classification model having the combination of the rule-based classification apparatus 31 and the learning type classification apparatus 35 shown in FIG. 3 is not optimum necessarily. Conversely, when the performance of the learning type classification apparatus is adequately reliable, the classification model having the combination of a rule-based classification apparatus 41 and a learning type classification apparatus 45 shown in FIG. 4 is considered more appropriate.

Actually, the optimum classification model is different depending on data. For example, for the defect data having the characteristic amount distributed as shown in the graph 102 of FIG. 10B, the classification model shown in FIG. 4 is more adequate than the classification model shown in FIG. 3 (the classification model shown in FIG. 3 cannot appropriately classify the pattern defect of FIG. 10B), but for the defect data having the characteristic amount distributed as shown in the graph 101 of FIG. 10A, the classification model shown in FIG. 3 can be expected having higher classification reliability than the classification model shown in FIG. 4.

As described above, the suitable classification model is different depending on defect data, so that there is a possibility of making it possible to improve the classification reliability by using plural classification models together than a particular classification model is adopted. The present invention generates plural models, calculates a criterion (model likelihood) which indicates the adequacy of a model about which model shall be used for defect data and classifies according to the criterion.

(ii) Execution of Classification

Defects are classified according to at least one classification model generated as described above. When plural classification models are generated, they are used in combination to execute classification. In other words, the likelihoods belonging to individual classes under the above-described individual models 12, 13 are calculated (14, 15). Then, there is a problem of how to calculate a final class likelihood from the likelihoods calculated independently under the individual models. According to the present invention, the model likelihoods of the individual models 12, 13 are calculated as a criterion indicating the adequacy of the pertinent model per se (16, 17), and a final class likelihood (combination likelihood) is calculated considering the model likelihoods (18). The method of calculating the model likelihood and the method of calculating the final class likelihood will be described later.

(2) Details of Defect Classification

Specific examples of defect classification according to the invention will be described in detail below.

(i) Generation of Classification Model

Figure 5:
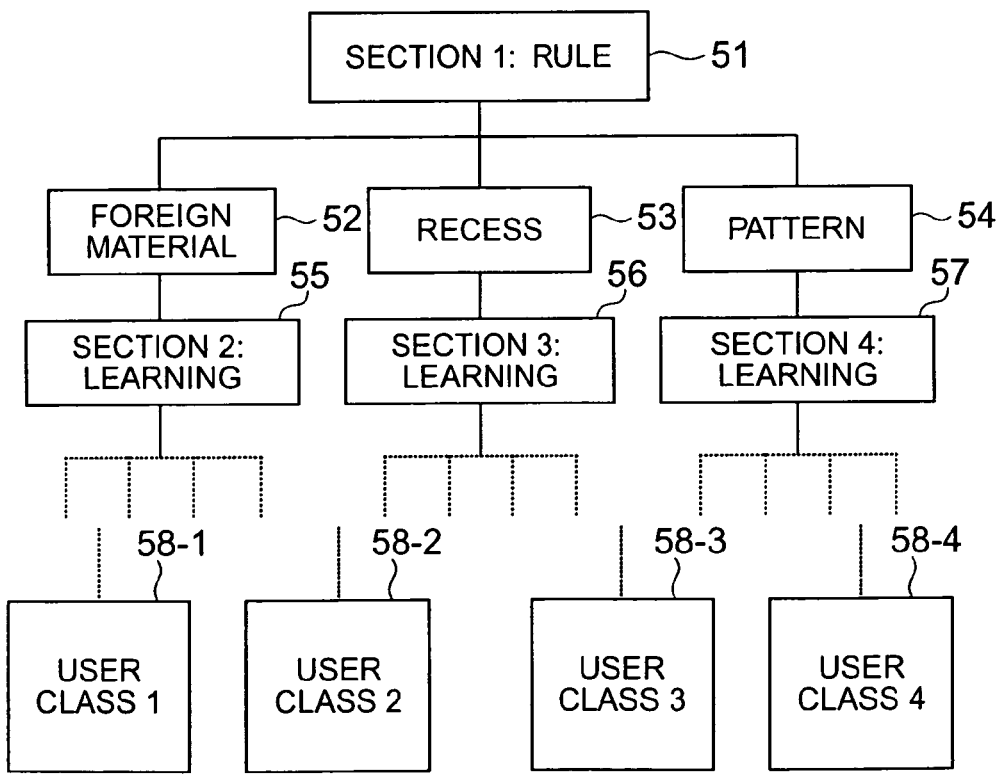
FIG. 5 is a diagram illustrating a classification model according to the first embodiment of the invention.

First, a classification model is previously generated before the classification processing is executed. FIG. 5 is a diagram schematically showing the relation between main classes and user classes before the classification model is generated.

For the classification model of this embodiment, it is assumed that a classification model is comprised of two layers of a high-order section 1 which is comprised of a rule-based classification apparatus 51, and low-order sections 2 to 4 which are comprised of learning type classification apparatuses 55 to 57. The rule-based classification apparatus 51 of the high-order section 1 calculates likelihoods belonging to three main classes of a "foreign material" 52, a "recess" 53 and a "pattern" 54 according to the if-then rule. Meanwhile, when it is assumed that a defect is classified into a certain main class, the learning type classification apparatuses 55 to 57 of the low-order sections 2 to 4 calculate likelihoods of the classes (user classes 1 to 4:58-1 to 58-4) which are defined as low-order classes of the main class. The relationship between the main class and the user classes is not defined in FIG. 5, but it is assumed in this embodiment that the defect is finally classified into any of the user classes 1 to 4.

Figure 6:
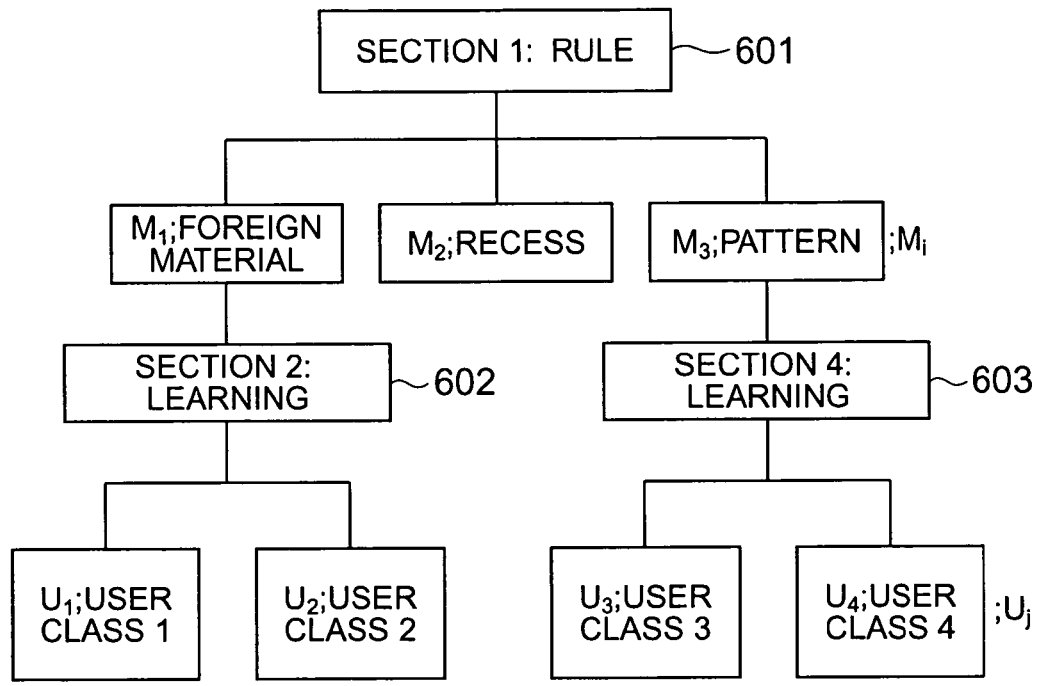
FIG. 6 is a diagram illustrating another classification model according to the first embodiment of the invention.
Figure 7:
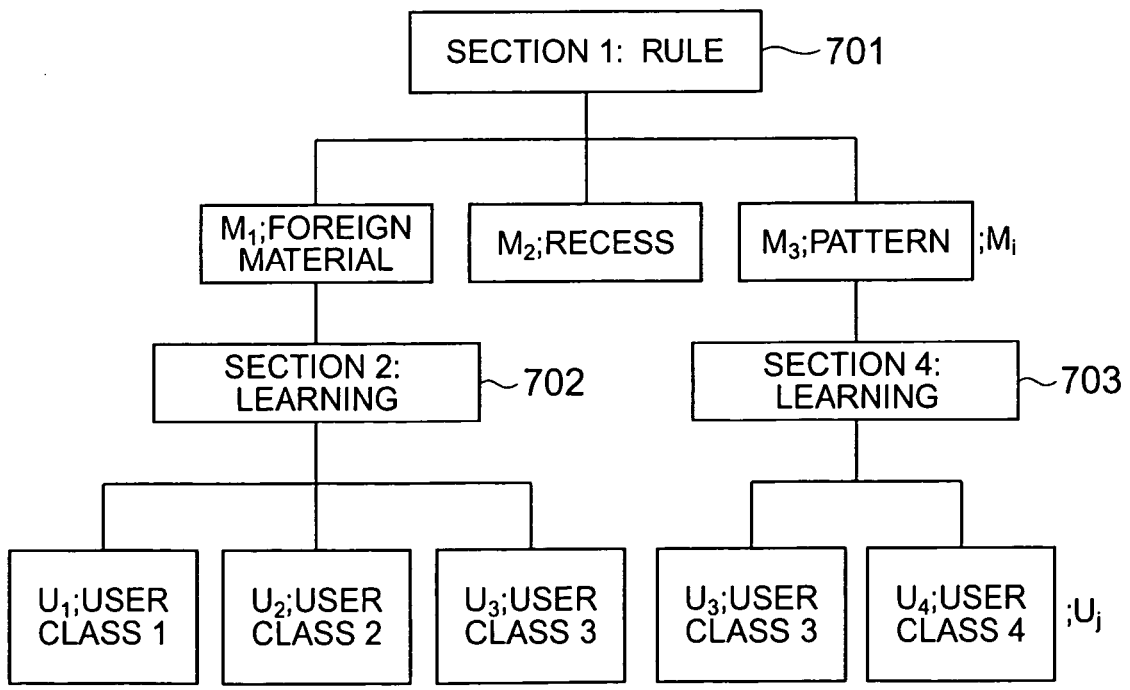
FIG. 7 is a diagram illustrating another classification model according to the first embodiment of the invention.

Then, a method for generation of a classification model will be described. The classification model shown in FIG. 6 or FIG. 7 is generated from the state shown in FIG. 5 by the method described below.

Figure 9A:
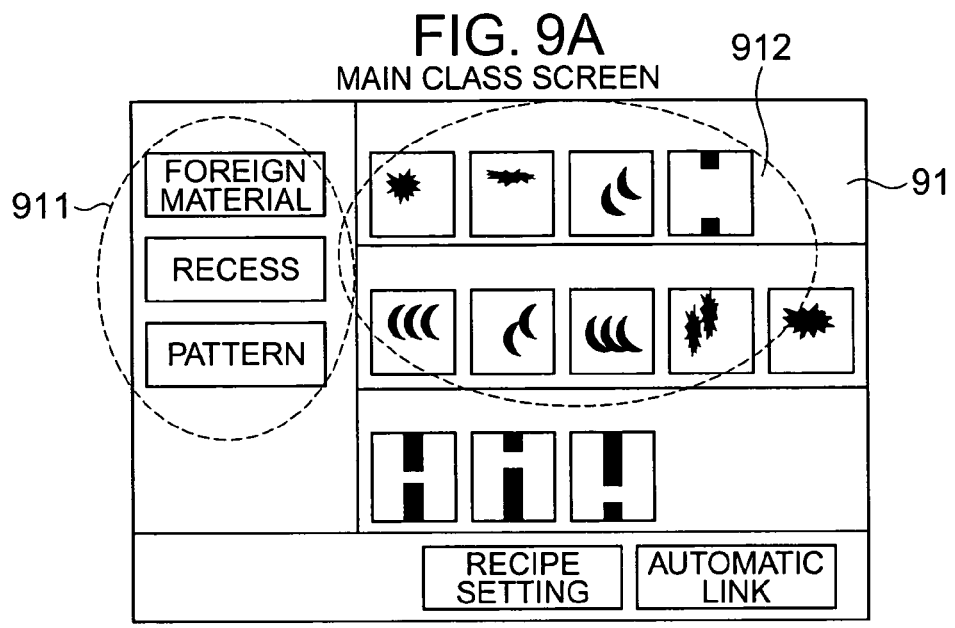
FIG. 9A to FIG. 9C are front diagrams of display screens showing user interfaces according to the first embodiment, where
Figure 9B:
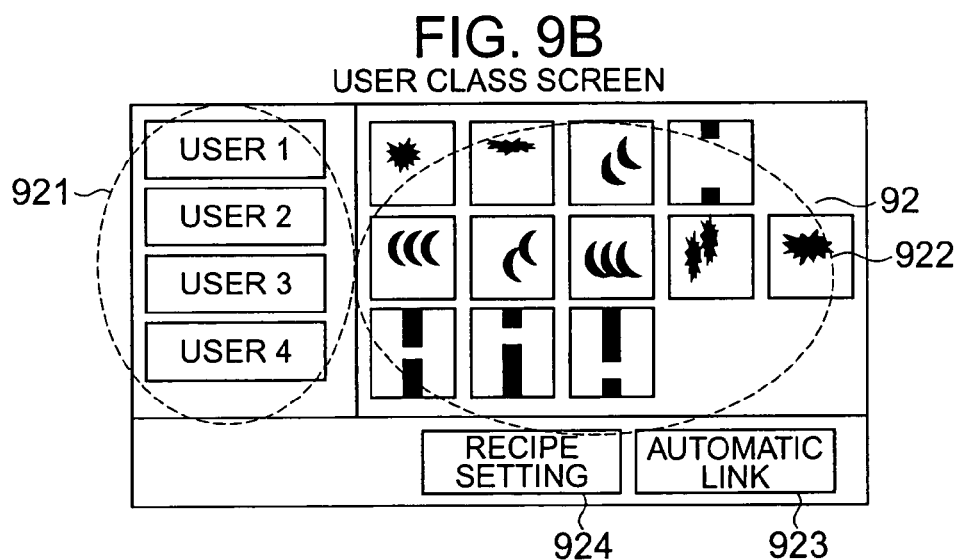
Figure 9C:
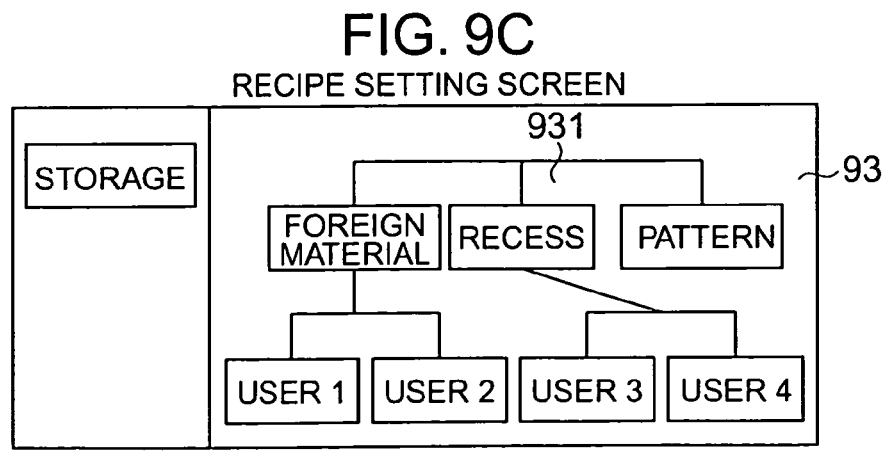

User interfaces are shown in FIG. 9A through FIG. 9C.

FIG. 9A shows a main class screen, where 91 denotes a rule-based classification screen. A list 911 of rule-base type classes and a list 912 of defect images showing that the likelihood of each rule-base type class becomes maximum, namely the most typical of the pertinent class, are shown.

Meanwhile, FIG. 9B shows a user class screen, where 92 denotes a screen (hereinafter referred to as the learning type classification screen) for teaching of classes by the learning type classification apparatus and is comprised of a list 921 of learning type classes and a list 922 of defect images. The user sets the class of a defect to be classified on the learning type classification screen 92 as a learning class and teaches the each defect image 922 to any of the learning type classes 921 by a drag and drop operation.

Then, a button "automatic link" 923 icon for instruction of automatic generation of a classification model is clicked to internally calculate the structure of the classification model.

To generate the classification model, a correlation between the main class and the user class is analyzed from the taught result by the user and the likelihood calculated result by the rule-based classification apparatus, and a classification model combining a rule-based classification apparatus 601 or 701 and learning type classification apparatuses 602, 603 or 702, 703 as shown in FIG. 6 or FIG. 7 is generated. Specifically, it is assumed that (1) a correlation between a main class Mi and a user class Uj is high when there are many defects which are taught as the class Uj by the learning type classification apparatus among the defects which are determined by the rule-based classification apparatus that the likelihood of the main class Mi is maximum, or (2) a correlation between the main class Mi and the user class Uj is high when the defects classified into the main class Mi are many among the defects taught as the user class Uj, and a hierarchical relationship is set between the main class and the user class which have a high correlation. For example, the above (1) and (2) can be formularized as follows.

[Classification Model Generation Rule 1]

When $N_{Uj}/N_{Mi}$ is $th_1$ or more or $N_{Mi}/N_{Uj}$ is $th_2$ or more, the user class Uj is determined to be a lower class of the main class Mi, where:

$N_{Mi}$: the number of defects that the likelihood of the main class Mi is determined to be maximum by the rule-based classification apparatus;

$N_{Uj}$: the number of defects that the likelihood of the user class Uj is determined to be maximum by the learning type classification apparatus; and $N_{Mi \cap Uj}$: the number of defects that the likelihood of the main class Mi is determined to be maximum by the rule-based classification apparatus and the likelihood of the user class Uj is determined to be maximum by the learning type classification apparatus.

A classification model suitable to the obtained teach data can be generated automatically by the above-described method.

A method of generating plural classification models when the suitable classification model is not necessarily single with respect to the distribution of the obtained teach data will be described.

In the example of FIG. 5, it is assumed that the user classes 1, 2 (58-1, 58-2) have a high correlation with the main class "foreign material" 52 and the user class 4 (58-4) has a high correlation with the main class "pattern" 54. It is also assumed that there are five samples of the user class 3 (58-3) among which four samples are with the maximum likelihood of the main class "pattern" 54 and one sample is with the maximum likelihood of the main class "foreign material" 52. According to the classification model generation rule 1, most (⅘=80%) of the defects belonging to the user class 3 (58-3) are with the maximum likelihood of the main class "pattern" 54, so that it seems adequate to set the user class 3 (58-3) to be below the main class "pattern" 54 but, actually it cannot be said with certainty that the likelihood of the main class 3 "pattern" 54 becomes maximum for most of the defects belonging to the user class 3 (58-3) because the amount of data is too small. Therefore, for example, when the amount of data is little, assumable plural models are generated by the next classification model generation rule 2 in addition to the classification model generation rule 1. According to the classification model generation rules 1, 2, the classification model combining the rule-based classification apparatus 601 or 701 and the learning type classification apparatuses 602, 603 or 702, 703 as shown in FIG. 6 or FIG. 7 is generated in the above example.

[Classification Model Generation Rule 2]

When the number of defects $N_{Uj}$ belonging to the user class Uj is a fixed level or below, plural classification models are generated as follows. It is assumed that, when defects belong to the user class Uj and the number of defects that the likelihood belonging to the main class Mi becomes maximum is $N_{Mi \cap Uj}$, a main class having the maximum value of $N_{Mi \cap Uj}$, and a main class having the second maximum value are determined to be Mmax1 and Mmax2 respectively. A model having the user class Uj determined to be below the Mmax1 and a model having the user class Uj determined to be below the Mmax1 and the Mmax2 are generated.

The method for automatic generation of a classification model for the obtained teach data was described above. It is also possible to manually determine a model or manually modify the automatically generated model. On the user interface screens of FIG. 9A through FIG. 9C, a "recipe setting screen" button 924 icon shown on the learning type classification screen 92 is clicked to jump to a recipe setting screen 93 of FIG. 9C, on which the configuration of the generated classification model is checked, and the user can also manually change the automatically generated model as required on the recipe setting screen 93. FIG. 9C shows only one classification model, but it may be configured to calculate, display and modify plural possible classification models.

Figure 15:
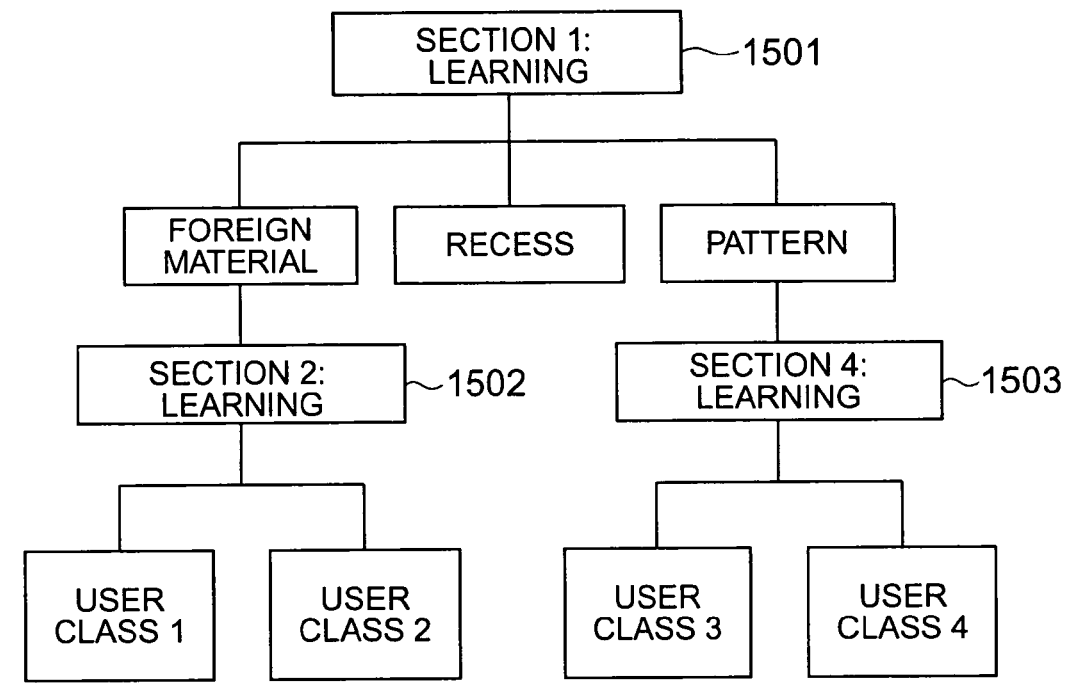
FIG. 15 is a diagram showing an example of a learning type classification model.
Figure 16:
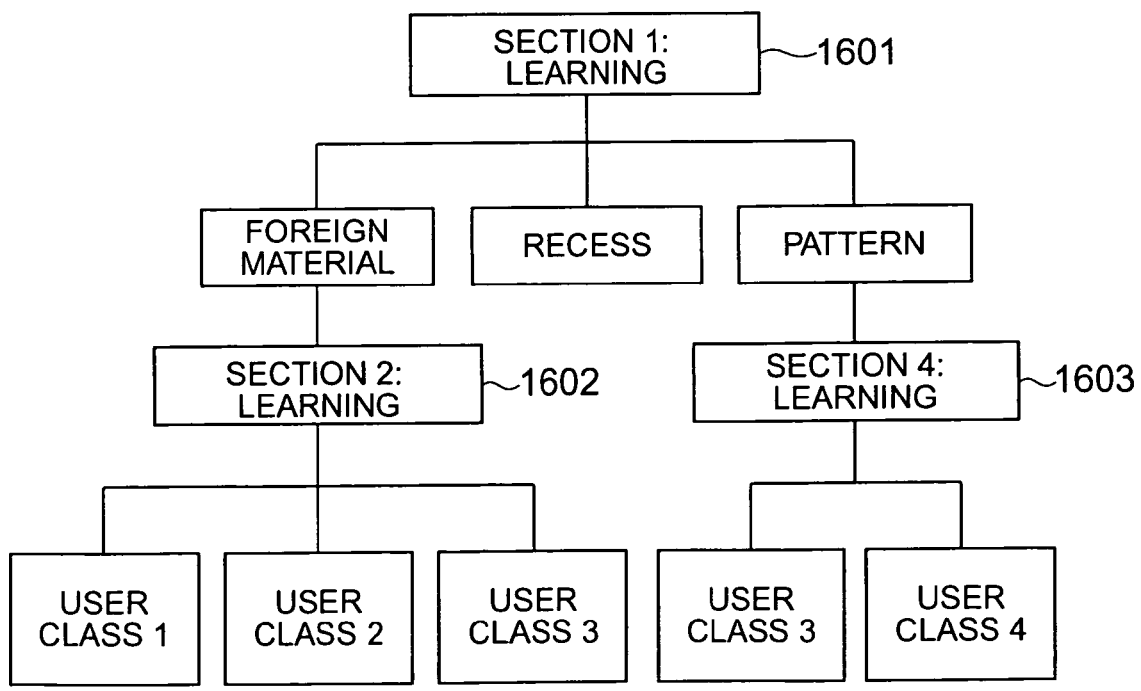
FIG. 16 is a diagram showing another example of the learning type classification model.
Figure 17:
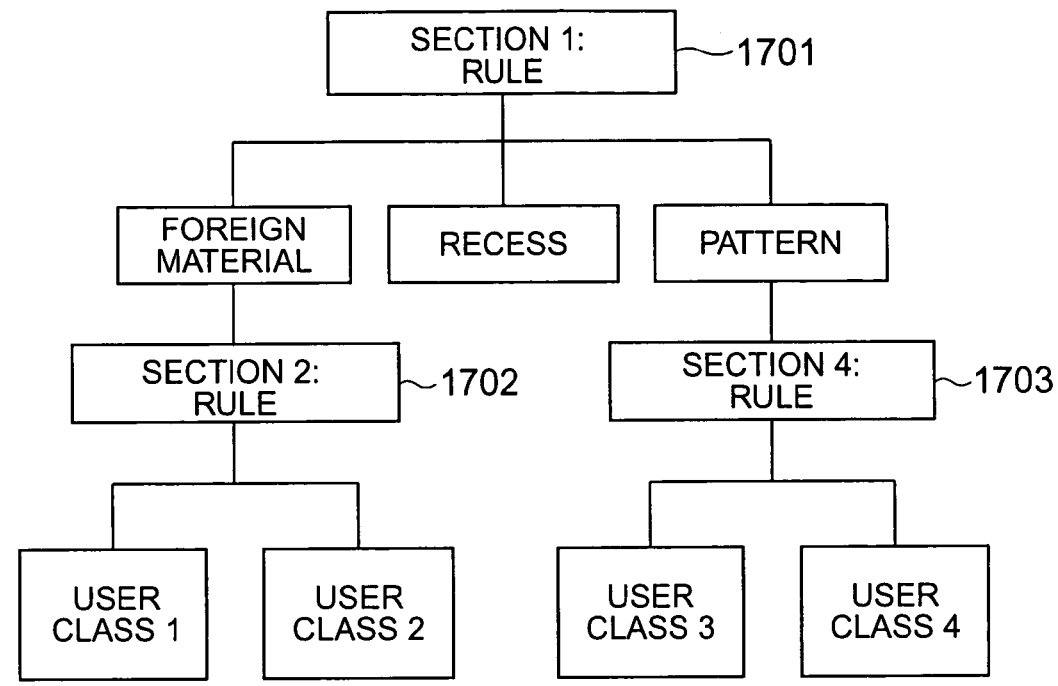
FIG. 17 is a diagram showing an example of a rule type classification model.
Figure 18:
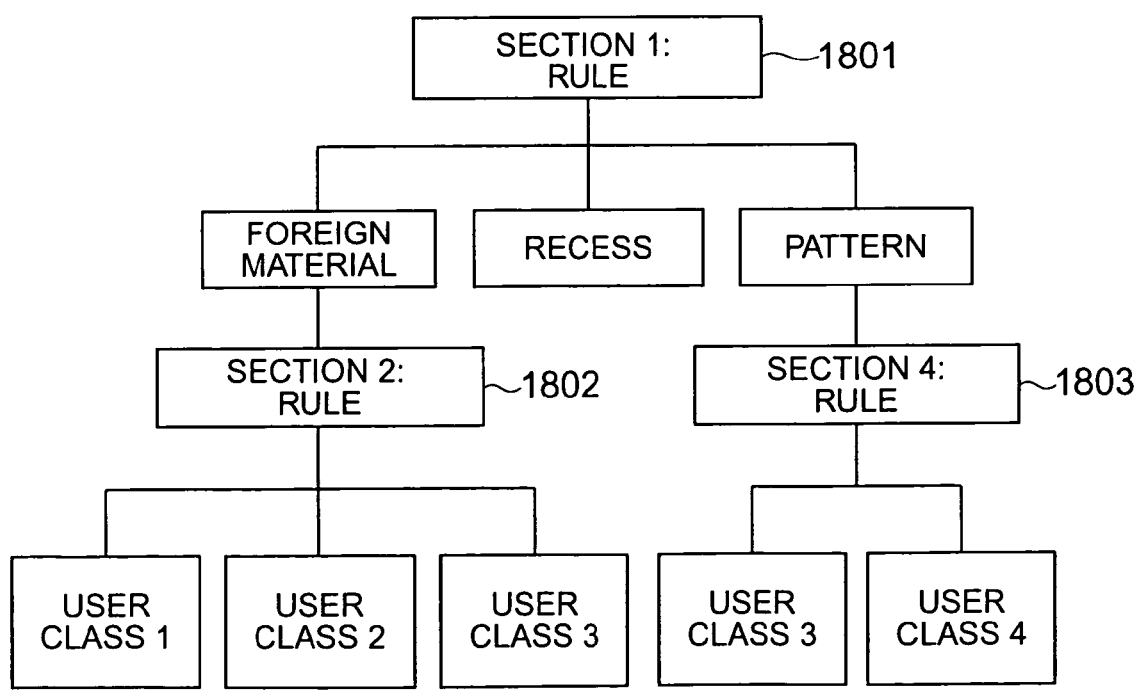
FIG. 18 is a diagram showing another example of the rule type classification model.

It was described that the two classification models were comprised of the hierarchical structure of the rule type classification apparatus and the learning type classification apparatus. Using the same classification model configuration method, a classification model comprising a combination of the plural learning type classification apparatuses (1501 to 1503 or 1601 to 1603) as shown in FIG. 15 or FIG. 16 can be configured as another structure. As still another configuration, a classification model may be configured by combining the plural rule type classification apparatuses (1701 to 1703 or 1801 to 1803) as shown in FIG. 17 or FIG. 18.

(ii) Execution of Classification

Figure 12:
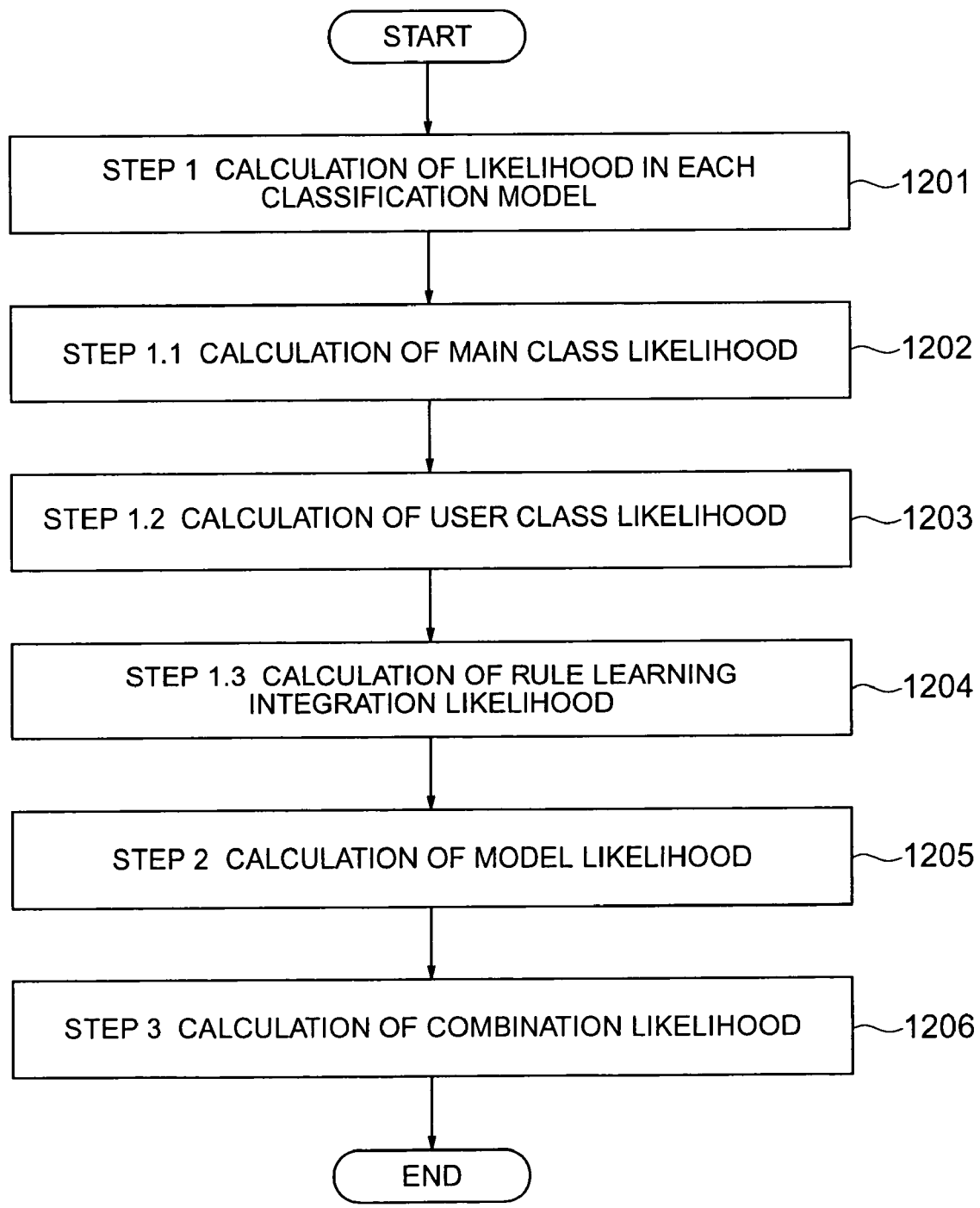
FIG. 12 is a diagram showing a flow of processing for classification.

Then, a process for execution of classification will be described in detail. FIG. 12 shows a flow of processing for the execution of classification. First, calculation of a likelihood of each classification model will be described with reference to FIG. 12.

STEP 1: Calculation of Likelihood in Each Classification Model (1201)

This step comprises three steps including calculation of main class likelihood, calculation of user class likelihood and calculation of rule learning integration likelihood from them.

STEP 1.1: Calculation of Main Class Likelihood (1202)

Figure 13:
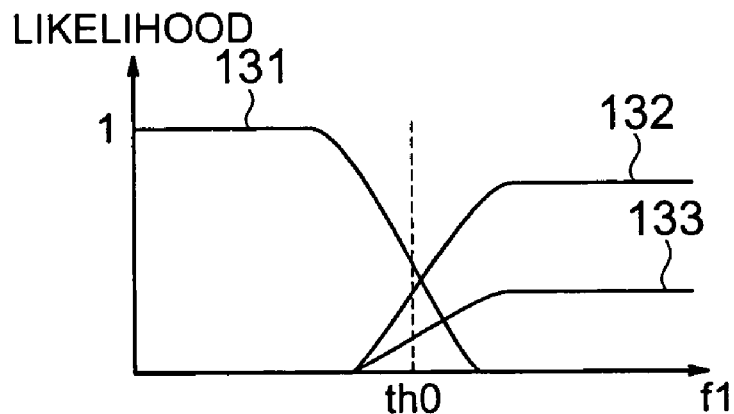
FIG. 13 is a diagram showing likelihood function of a rule type classification apparatus.

The rule-based classification apparatus does not classify into a particular class but calculates the likelihood of each class on the basis of fuzzy logic (fuzzy if-then rule). The likelihood is an index indicating a degree of probability of belonging to the class and falls in a value range of 0 to 1. It indicates that the closer to 1, the higher the degree of probability of belonging to its class. A function for calculation of the likelihood from a value of a characteristic amount is called the likelihood function and provided by the system. An example of a main class likelihood function is shown in FIG. 13. In the drawing, 131 denotes a likelihood function of a foreign material, 132 denotes a likelihood function of a pattern and 133 denotes a likelihood function of a recess. The likelihood to each class is calculated from a value of a characteristic f1 by 131, 132 and 133.

STEP 1.2: Calculation of User Class Likelihood (1203)

Figure 14:
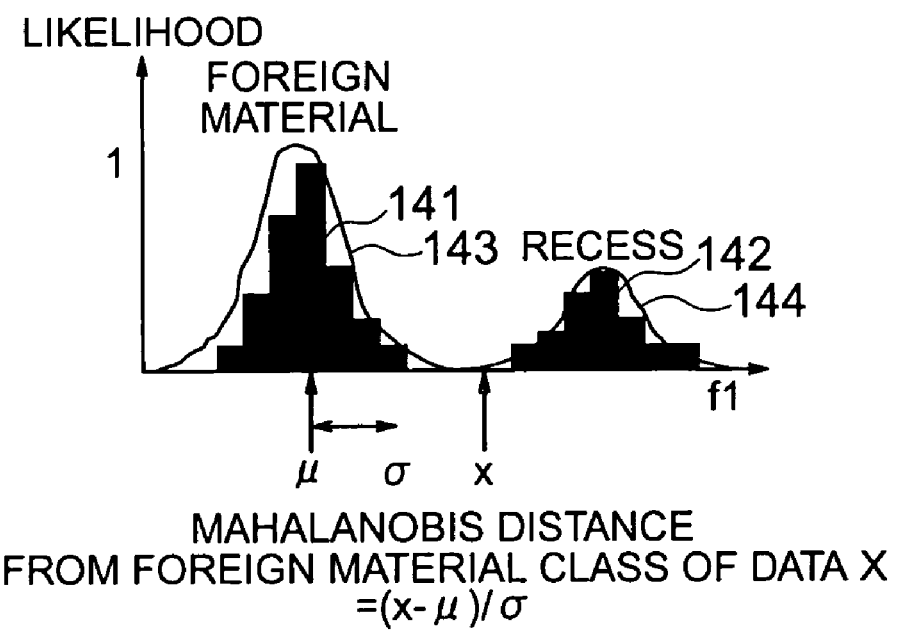
FIG. 14 is a diagram illustrating a Mahalanobis distance.

A method for calculation of the user class likelihood by the learning type classification apparatus is shown in FIG. 14. In the drawing, 1401 denotes an example of the likelihood function for calculation of the-user class likelihood. As the likelihood function, for example, the Mahalanobis distance in a characteristic space may be used. The Mahalanobis distance is a distance determined by assuming that distributions 141, 142 of teach data on individual classes comply with. (generally multi-dimensional) normal distributions 143, 144 in a characteristic amount space and standardizing a distance from the center of each normal distribution to the characteristic amount vector of a pertinent defect by the dispersion of a normal distribution (covariance matrix). Here, the likelihood of the learning type class can be calculated as follows.

(Likelihood belonging to learning type class i)=$D_i/\Sigma D_i$ where, $D_i$ is the Mahalanobis distance between a learning type class Di and a characteristic amount vector of defects to be classified.

A difference from the likelihood function of the main class likelihood is that the likelihood function is determined by teach data.

STEP 1.3: Calculation of Rule Learning Integration Likelihood (1204)

Then, class likelihood combining the calculated main class likelihood and the user class likelihood is calculated (hereinafter referred to as the rule learning integration likelihood). The user class likelihood is likelihood defined on the assumption that classification into a high-order main class is made. Therefore, even if the user class likelihood has a high value, it is necessary to define so that the rule learning integration likelihood of the user class has a low value when its high-order main class likelihood has a very low value.

For example, the rule learning integration likelihood can be calculated as an average of the load of the main class likelihood and the user class likelihood.

(Rule learning integration likelihood)=$\alpha$*(main class likelihood)+(1-$\alpha$)*(user class likelihood)

where, $\alpha$ denotes a degree of placing emphasis on the main class likelihood and may be determined descendingly on the basis of the empirically obtained reliability of the rule type classification apparatus and the learning type classification apparatus. As another calculation method, it is conceivable that the main class likelihood and the user class likelihood are added, or the like.

The above-described step is executed for each classification model to determine a class likelihood under each classification model.

STEP 2: Calculation of Model Likelihood (1205)

Then, for each generated classification model, model likelihood is calculated as an index indicating the adequacy of the model.

Among the plural models generated, an optimum classification model is actually different depending on each defect. For example, it is assumed that two types of models shown in FIG. 3, FIG. 4 are generated. When it is apparent from the value of a characteristic amount that the defect to be classified is a pattern defect and it is not necessary to particularly calculate the likelihood by the learning type classification apparatus, it is conceivable that the model of FIG. 3 is more advantageous than the model of FIG. 4 which has a possibility of misclassification into a foreign material. Meanwhile, when it is not apparent from the value of the characteristic amount whether the defect is a pattern defect or a foreign material, it is considered more advantageous to classify by the learning type classification apparatus according to the model of FIG. 4. Thus, the optimum classification model is actually different for each defect.

For example, the model likelihood can be defined for each defect as follows:

Model likelihood=$1/(-\Sigma p_i \log p_i)$ where, $p_i$ is likelihood of the defect to be classified in the main class Mi.

The denominator of the above equation is entropy having a property that when $p_i$ is more uniform, the value becomes larger. Therefore, when the $p_i$ is more uniform, in other words, when the $p_i$ is not different depending on the main classes and cannot be classified into a particular class with high reliability, the entropy becomes higher, and the model likelihood becomes small as a result. This model likelihood is calculated for each model.

STEP 3: Calculation of Combination Likelihood (1206)

Defect class likelihood can be formulated as shown below from the rule learning integration likelihood (STEP 1 in FIG. 12) and the model likelihood (STEP 2 in FIG. 12) under each model:

$$P_{Cj} = \Sigma_i P(C_i|M_i) P(M_i) \quad (1)$$

$C_j$: Classification class,
$P_{Cj}$: Likelihood of class $C_j$,
Mi: Classification model i,
$P(C_j|M_i)$: Likelihood of class $C_j$ by classification model $M_i$, and
$P(_{Mi})$: Likelihood of classification model Mi.

The formula (1) can be explained as a formula that the class likelihood is calculated by plural models and a weighted average according to likeliness (=model likelihood) of the classification model per se is calculated.

Thus, an inherent and optimum classification model can be provided automatically in response to a defect classification request different depending on each user, and it becomes possible to improve the classification performance.

Figure 11:
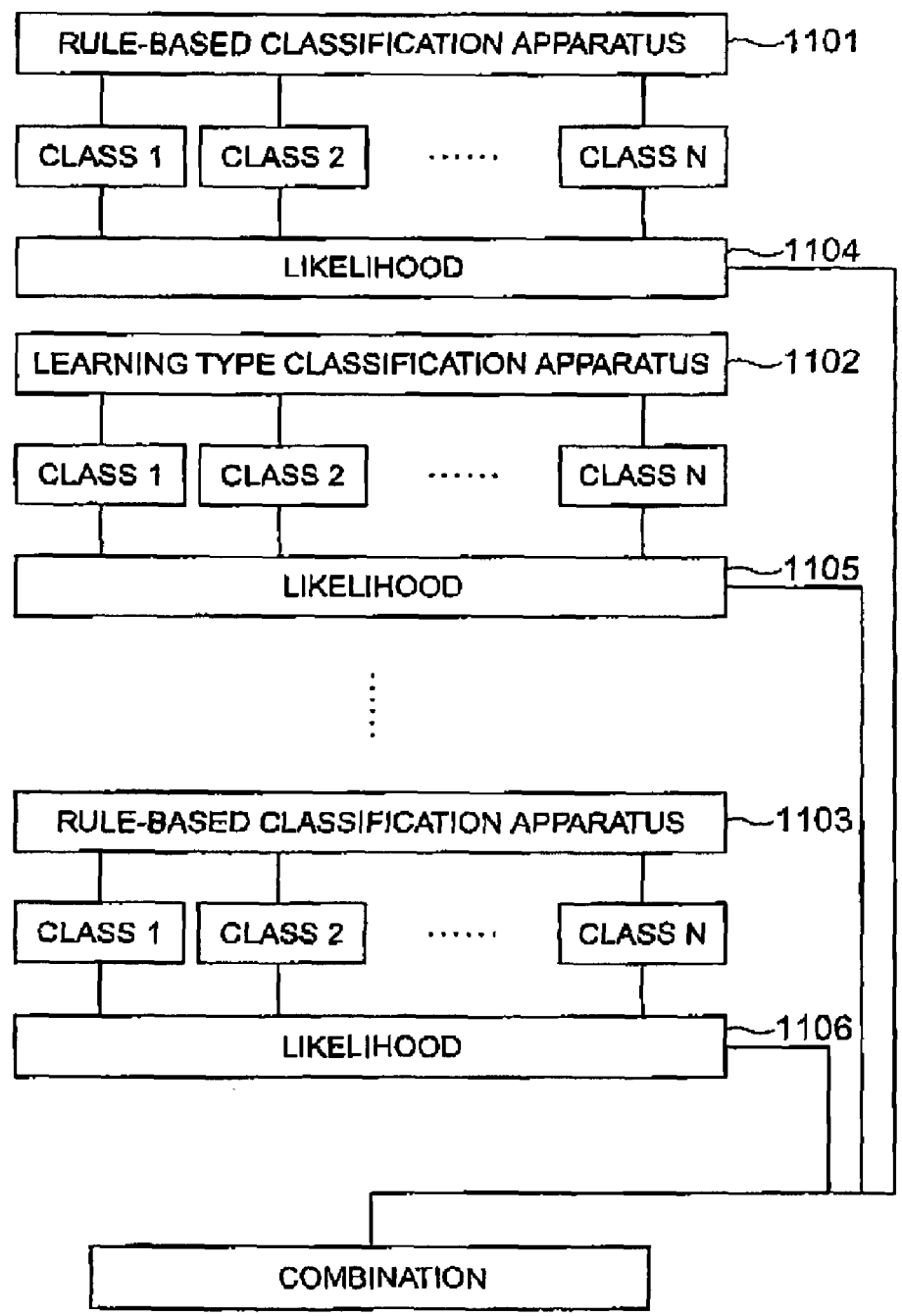
FIG. 11 is a diagram showing a classification model.

The above description was made on the example assuming the model having the rule-based classification apparatus and the learning type classification apparatus connected hierarchically. But, as shown in FIG. 11, likelihoods 1104 to 1106 calculated by a rule-based classification apparatus 1101 and a learning type classification apparatus 1102 which are parallel to each other or a rule-based classification apparatus 1103 may be combined. In FIG. 11, the rule-based classification apparatuses 1101, 1103 do not classify into a particular class but calculate the likelihoods 1104, 1106 according to the so-called fuzzy logic (fuzzy if-then rule). In other words, the likelihood function configured by the designer is used to calculate the likelihood of each class.

By adopting the structure shown in FIG. 11, the instable performance of the learning type classification apparatus when the amount of teach data is little can be resolved. For example, when the amount of teach data is little, the model likelihood of the learning type classification apparatus 1102 is lowered, and the likelihoods 1104, 1106 calculated by the rule-based classification apparatuses 1101, 1103 are regarded as relatively important. Conversely, when the amount of teach data is large, the model likelihood of the learning type classification apparatus 1102 is increased, and the likelihood 1105 calculated by the learning type classification apparatus 1102 may be regarded as relatively important.

Instable performance of the learning type classification apparatus 1102 when the amount of teach data is variable depending on the classes can be resolved. For example, in a class having a little amount of teach data or a region of the characteristic amount space, the model likelihood of the learning type classification apparatus 1102 is lowered, and the likelihoods 1104, 1106 calculated by the rule-based classification apparatuses 1101, 1103 are regarded as relatively important; conversely, in a class having a large amount of teach data or a region of the characteristic amount space, the model likelihood of the learning type classification apparatus 1102 is raised, and the likelihood 1105 calculated by the learning type classification apparatus 1102 may be regarded as relatively important.

Thus, an inherent and optimum classification model can be provided automatically in response to the defect classification request different depending on the individual users, and it becomes possible to improve the classification performance.

The embodiments of the invention were described above.

In the above description, the classification of defect images detected by the electron type image detector was described.

The invention can similarly be applied to the classification of defect images detected by an optical image detector.

Besides, defects may be classified by analyzing output information (e.g., an X-ray spectrum by EDX) from at least one of plural electron or optical type image detectors or a defect analyzing apparatus and calculating a characteristic amount vector of each defect. Of course, the defects may be classified by calculating the characteristic amount vector from the output information alone of the defect analyzing apparatus or the characteristic amount vector may be calculated according to reference data corresponding to the defects.

The invention was described in detail with reference to the examples of the classification of the images of defects caused on the surface of a semiconductor electronic circuit board, but the application of the invention is not limited to the above description.

For example, the invention can also be applied to a method for automatic classification of an image of a defect portion formed on the surface of a printed circuit board, an FPD, a liquid crystal display board, or the like.

According to the present invention, the classification performance can be improved by automatically providing an inherent and appropriate classification model in response to a defect classification request which is different depending on individual users.

And, according to the present invention, an optimum classification model can be provided automatically to stabilize the classification performance even when the classification of defects requested by the user is changed because of occurrence of a new defect class due to a change in process, or the like.

Besides, according to the present invention, necessity of manual setting of the classification model in response to a defect classification request can be eliminated by automatically providing an optimum classification model.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for classifying defects using a defect review apparatus, comprising:

obtaining an image of a defect on a sample using one of an electron type image detector and an optical image detector;

extracting a characteristic of the defect from the image using a characteristic extractor; and classifying the defect in accordance with the extracted characteristic, and based on a rule-based classification and a learning type classification, wherein the step of classifying further comprises:

calculating a set of first likelihoods of the defect belonging to each of a plurality of defect classes of the rule-based classification, by use of the extracted characteristic using a likelihood function which applies a plurality of if-then rules to calculate an index corresponding to a degree of probability that the defect belongs to a particular defect class;

calculating a set of second likelihoods of the defect belonging to each of a plurality of defect classes of the learning type classification, by use of the extracted characteristic, wherein the learning type classification determines a distance to a center of a normal distribution of data for each defect class;
calculating a third set of likelihoods of the defect belonging to each of the defect classes of the learning type classification and/or the defect classes of the rule-based classification, by use of the first and second likelihoods; and
classifying the defect by use of the third likelihoods; and
wherein the rule-based classification and learning type classification are present in a parallel relationship with each other and independent of each other.

2. The method for classifying defects according to claim 1, wherein the image is an SEM image.

3. The method for classifying defects according to claim 1, wherein the defect image is obtained while the sample is positioned in accordance with position coordinate data of the defects on the sample.

4. The method for classifying defects according to claim 1, wherein the plurality of classes of the rule-based classification are selected from class sets displayed on a display screen.

5. The method for classifying defects according to claim 1, wherein the third likelihoods are calculated of by using a classification model comprising a relation of the classes of the learning type classification and the classes of the rule-based classification.

6. The method for classifying defects according to claim 5, further comprising:
generating a plurality of classification models;
determining a likelihood of the adequacy of each classification model; and
deciding a class likelihood according to the determined model likelihood.

7. An apparatus for classifying defects, comprising:
an imager which obtains an image of a defect on a sample;
a characteristic extractor which extracts a characteristic of the defect from the image;
a classifier which classifies the defect in accordance with the extracted characteristic, and based on a rule-based classification and a learning type classification, and
a display for displaying the image of the defect and the classification result on a screen;
wherein said classifying means comprises:
a rule-based classifier which calculates a set of first likelihoods of the defect belonging to each of a plurality of rule classes by use of the characteristics of the defect using a likelihood function which applies a plurality of if-then rules to calculate an index corresponding to a degree of probability that the defect belongs to a particular class,
a learning type classifier which calculates a set of second likelihoods of the defect belonging to each of a plurality of defect classes by use of the characteristic of the defect, wherein the learning type classifier determines a distance to a center of a normal distribution of data for each defect class; and
a calculator which calculates a set of third likelihoods of the defect belonging to each of said defect classes and/or rule classes, by use of the first and second likelihoods, and
a classifier which classifies the defects by use of the calculated third likelihoods; and
wherein the rule-based classification and learning type classification are present in a parallel relationship with each other and independent of each other.

8. The apparatus according to claim 7, wherein said display is adapted for displaying a plurality of class sets on the screen, for selection of said rule classes.

9. The apparatus according to claim 7, wherein the classifying means includes a computing section for calculating a likelihood of the adequacy of each of a plurality of classification models and classifies the defects by using said likelihood of the adequacy of the classification models.

10. The apparatus according to claim 9, wherein the classifying means further includes a computing section for calculating said third likelihood and a model likelihood of the adequacy of the individual classification models to decide a class likelihood according to the model likelihood.

* * * * *